Patented July 22, 1941

2,250,379

UNITED STATES PATENT OFFICE 2,250,379

CLEANING COMPOSITION AND PROCESS FOR THE PREPARATION THEREOF

Carl Johnson, Maplewood, N. J.

No Drawing. Application March 17, 1938,
Serial No. 196,543

10 Claims. (Cl. 252—142)

My invention relates to a cleaning composition and process for the preparation thereof.

In the past various cleaning problems have arisen in which the action of acid cleaning materials has been found desirable. In many instances these acids are the most effective cleaning agents, but their use has been restricted because of the disadvantages which such use involves. Most strong acids are quite corrosive to flesh, clothing, and metals. Even where they are used in dilute solution the evaporation of water causes a concentration of acid which may easily become dangerous. Other acids give off dangerous vapors and cause corrosion through these vapors.

Some efforts have been made to overcome these objections through the use of acid salts. Such salts, while they are somewhat safer, are not very effective for cleaning and will do serious damage, particularly to fibrous materials.

The present invention involves a type of cleaning material which may be safely used for cleaning surfaces of almost any type, such as painted, varnished and lacquered surfaces, tile, porcelain, glass, metal surfaces, or almost any type of surface which is covered with a film of the type for the removal of which acid cleaning agents are desirable. A particular feature resides in the fact that such compounds do not crystallize when exposed to drying in the air so that when applied to a surface they remain uniformly distributed thereover.

The transportation of acids also presents a serious problem, requiring glass or metal containers; and an important object of the present invention is to produce acid cleaning agents in the form of dry powders which may be shipped in wooden or paper containers without danger.

The discovery resides in the fact that the objectionable effects of the acids on the surfaces to be cleaned and on the persons and clothing of the users may be very greatly reduced or even practically entirely avoided by the formation of salts of these acids with weak organic bases. Furthermore, in order to avoid injury it is necessary to use an acid which is non-oxidizing when in dilute solution, since the effect of the use of these salts when dissolved in water is to prevent the presence of a concentrated solution of the acid.

As bases, I may use any organic base having a dissociation constant lower than $5 \times 10^{-9}$. While the preferred basic material is urea, I may also utilize thiourea, formamide, acetamide, acetanilide, anthranilic acid, glycine (amino acetic acid), alanine (amino propionic acid), alpha and beta naphthylamine, phenylene diamines, toluidines, and aniline. Stronger bases are unsatisfactory inasmuch as they tend to neutralize the acid to too great an extent and thereby destroy its cleaning properties.

I will now describe the production, properties and uses of certain representative cleaning materials coming within the scope of my invention.

Urea hydrochloride may be produced by the reaction of urea with hydrochloric acid in molecular proportions, urea acting in this case as a mono-acid base. The equation is probably as follows:

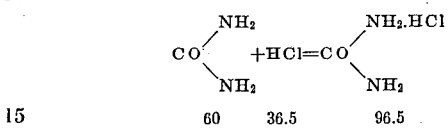

The solution of urea hydrochloride obtained by dissolving 60 grams of urea in 116 grams of 20° Bé. hydrochloric acid containing 31.45% of hydrogen chloride by weight is safe to handle, does not give off corrosive vapors, and is an effective cleaning agent when employed either at full strength or when diluted with water to any desired concentration. This material even when applied in full strength to vegetable fibers, such as cotton cloth, and allowed to remain in contact therewith does not appreciably weaken the fibers, and thus differs entirely in its effect from the free hydrochloric acid. The product is very hygroscopic, and therefore any surface to which it is applied remains moist so that the action of the acid is prolonged. The compound is not volatile at ordinary temperature so that hydrochloric acid is not lost by evaporation. It attacks steel very slowly, to a very much less degree than hydrochloric acid. Apparently when the acid concentration through evaporation of water reaches a dangerous point the acid which has been liberated by dissociation in solution recombines with the urea to form a comparatively non-injurious product and to prevent loss of the acid by evaporation.

Urea will also combine with sulphuric acid. For example, 120 grams of urea may be dissolved in 105 grams of 66° Bé. sulphuric acid containing 93.2% sulphuric acid by weight. A large amount of heat is liberated by the reaction which appears to be as follows:

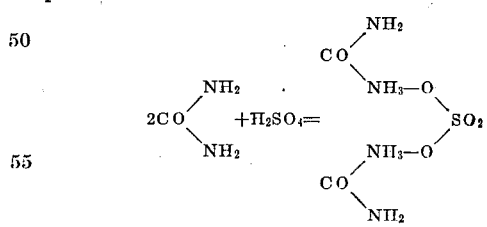

Since the heat is apt to convert a part of the urea into ammonium cyanate which may react with the sulphuric acid to form ammonium sulphate and cyanic acid or one of its polymers, I prefer to carry out this reaction by cooling the sulphuric acid considerably and adding the urea while this cooling is continued. In small quantities, however, if the urea is added to the sulphuric acid the temperature may rise to 200° F. without any appreciable loss of acidity. This mixture when cooled to 80° F. becomes a syrupy liquid which upon stirring crystallizes en masse with a rise in temperature. The resulting product can be broken up into a slightly damp powder, which is slightly hygroscopic, has no injurious effect on skin or clothing, and does not char wood, paper, varnish or paint even if applied while hot and in liquid form.

I further discovered that urea hydrogen chloride can be obtained in powder form mixed with sodium sulphate by dissolving urea in sulphuric acid while cooling the mixture and then while it is still liquid adding sodium chloride in sufficient quantity to react with the urea sulphate to form urea chloride and sodium sulphate. The urea fixes the hydrochloric acid and prevents its escape. The following equations indicate the probable reactions:

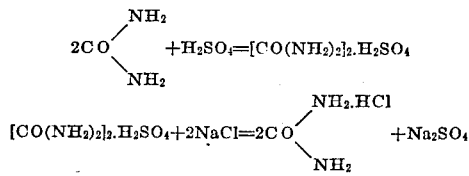

For example, 120 grams of urea may be dissolved in 105 grams of 66° Bé. sulphuric acid while cooling. 117 grams of sodium chloride are then added. No hydrochloric acid is lost. If, on the other hand, the sodium chloride and urea are mixed and the sulphuric acid is then added a vigorous evolution of hydrogen chloride takes place. The product obtained in this manner is a powder which when dissolved in water releases approximately 20% of its weight of hydrogen chloride, which is effective for cleaning but does not have the objectionable properties of free hydrochloric acid and can therefore be packed in metal or wood containers and does not require glass carboys or rubber-lined drums.

Of course it is also possible to prepare the urea sulphate as a powder and mix therewith sodium chloride in any desired proportion so as to yield hydrochloric acid or a mixture of hydrochloric and sulphuric acids when dissolved in water.

In the preparation of the compound to produce volatile acid products in dry form, any salt of the volatile acid may also be used. For instance, sodium chloride, potassium chloride, calcium chloride, magnesium chloride, and zinc chloride are available. I prefer to use a chloride which yields a water-soluble sulphate, and therefore calcium chloride would not be satisfactory unless an insoluble content in the product would be unobjectionable. The alkali metal salts are preferred but others may be used.

While I have described the use of urea, I wish it to be understood that this description is given merely by way of example and that the other bases mentioned above or any other weak organic base having a dissociation constant less than about $5 \times 10^{-9}$ may be used. Anthranilic acid, aniline, alanine and toluidine in most instances will produce dry materials which can be reduced to powder form. Other weak bases often produce viscous liquids or pastes.

While I have described herein one embodiment of my invention, I wish it to be understood that I do not intend to limit myself thereby except within the scope of the appended claims.

What I claim is:

1. A cleaning composition in the form of a substantially dry product capable of releasing a substantial quantity of available hydrogen chloride when admixed with water, comprising the reaction product of urea sulfate and a sufficient quantity of a water-soluble metallic chloride to form urea chloride and the sulfate of the cation of such reactant chloride with said urea sulfate.

2. A cleaning composition in the form of a substantially dry product capable of releasing substantially 20% of its weight of available hydrogen chloride when admixed with water, comprising the reaction product of urea sulfate and a sufficient amount of sodium chloride to form urea chloride and sodium sulfate with said urea sulfate.

3. A cleaning composition in the form of a substantially dry product capable of releasing a substantial quantity of available hydrogen chloride when admixed with water comprising a mixture of urea sulfate and a water soluble metallic chloride.

4. A cleaning composition in the form of a substantially dry product capable of releasing a substantial quantity of available hydrogen chloride when admixed with water comprising a mixture of urea sulfate and sodium chloride.

5. A process for the preparation of a cleaning composition in the form of a substantially dry product capable of releasing a substantial quantity of available hydrogen chloride when admixed with water, comprising dissolving two molar weights of urea in one molar weight of concentrated sulfuric acid while cooling the mixture and then mixing the reaction product while still in liquid form with a sufficient quantity of a water-soluble metal chloride to form urea chloride and the sulfate of the cation of the reactant chloride with such reaction product.

6. A process for the preparation of a cleaning composition in the form of a substantially dry product capable of releasing a substantial quantity of available hydrogen chloride when admixed with water, comprising dissolving two molar weights of urea in one molar weight of concentrated sulfuric acid while cooling the mixture and then mixing the reaction product while still in a liquid form with a sufficient quantity of a chloride of the alkali metal group to form urea chloride and the sulfate of the cation of the reactant chloride with such reaction product.

7. A process for the preparation of a cleaning composition in the form of a substantially dry product capable of releasing a substantial quantity of available hydrogen chloride when admixed with water, comprising dissolving two molar weights of urea in one molar weight of concentrated sulfuric acid while cooling the mixture and then mixing the reaction product while still in liquid form with a sufficient quantity of sodium chloride to form urea chloride and sodium sulfate with such reaction product.

8. A cleaning composition in the form of a substantially dry product capable of releasing a substantial quantity of available hydrogen chloride when admixed with water, comprising a mixture of urea sulfate and a chloride of the alkali metal group.

9. A cleaning composition in the form of a substantially dry product capable of releasing a substantial quantity of available hydrogen chloride when admixed with water, comprising the reaction product of urea sulfate and a sufficient quantity of a chloride of the alkali metal group to form urea chloride and the sulfate of the cation of the reactant chloride with such urea sulfate.

10. A cleaning composition in the form of a substantially dry product capable of releasing a substantial quantity of available hydrogen chloride when admixed with water, comprising a material selected from the group consisting of a mixture of urea sulfate and a sufficient quantity of a water-soluble metallic chloride to react with the urea sulfate to produce urea chloride and the sulfate of the cation of the water-soluble metallic chloride with such urea sulfate and the reaction product of such mixture.

CARL JOHNSON.